United States Patent [19]
Akama et al.

[11] Patent Number: 5,896,564
[45] Date of Patent: Apr. 20, 1999

[54] MECHANISM FOR ATTACHING AND DETACHING A PORTABLE CORDLESS TELEPHONE IN A MOTOR VEHICLE

[75] Inventors: Tomoyuki Akama; Masao Ishizuka; Masayo Iida, all of Saitama-ken, Japan

[73] Assignee: Pioneer Electronic Corporation, Tokyo, Japan

[21] Appl. No.: 08/851,275

[22] Filed: May 5, 1997

[30] Foreign Application Priority Data

May 17, 1996 [JP] Japan .................................. 8-147922

[51] Int. Cl.$^6$ .................................................. H04B 1/38
[52] U.S. Cl. ........................... 455/90; 455/346; 379/455
[58] Field of Search .................................. 455/550, 575, 455/90, 118, 345, 346, 348, 349, 351, 347; 379/433, 454, 455; 361/814

[56] References Cited

U.S. PATENT DOCUMENTS

| | | | |
|---|---|---|---|
| 4,776,553 | 10/1988 | Kobayashi | 455/90 |
| 5,438,685 | 8/1995 | Sorensen et al. | 455/90 |
| 5,787,167 | 7/1998 | Anderson | 379/455 |

*Primary Examiner*—Thanh Cong Le
*Attorney, Agent, or Firm*—Nikaido, Marmelstein, Murray & Oram LLP

[57] ABSTRACT

There is provided a mechanism for attaching and detaching a portable cordless telephone in a motor vehicle, the mechanism comprising: a holder capable of holding the portable cordless telephone and pivotable from its inmost position in the mechanism to its maximum outwardly projected position; a spring device enabling the holder together with the portable cordless telephone to pivot towards their outwardly projected positions: a lock/unlock device provided for locking/unlocking the holder and the portable cordless telephone on the mechanism. When the holder and the portable cordless telephone are released from their locked conditions by an action of the lock/unlock device, the holder will be pressed by the above spring device, so that the holder together with the portable cordless telephone may pivot outwardly until the holder arrives at its maximum outwardly projected position.

8 Claims, 8 Drawing Sheets ered, in a position of the center console of a vehicle# MECHANISM FOR ATTACHING AND DETACHING A PORTABLE CORDLESS TELEPHONE IN A MOTOR VEHICLE

BACKGROUND OF THE INVENTION

The present invention relates to a mechanism for attaching and detaching an electronic instrument (such as a portable cordless telephone) in a motor vehicle, or a mechanism for attaching and detaching an operating section of an electronic instrument to the main body thereof in a motor vehicle.

It has been known that a motor vehicle may be provided with a portable cordless telephone. Such a portable cordless telephone usually includes a wireless handset having a plurality of push-buttons. A user may perform his desired wireless communication with a person far away from the motor vehicle simply by pushing push-buttons on the cordless handset.

FIG. 8 illustrates a condition in which a center console 102 is provided between a driver seat and a passenger seat in a vehicle room, a portable cordless telephone 105 is attached onto the center console 102. In detail, the center console 102 is provided with a telephone adaptor 103 having a connector 104, and a connector 106 of the portable cordless telephone 105 is inserted into the connector 104 in a direction shown by an arrow G, thereby completing a predetermined electric connection between the two connectors 104 and 106. In this way, the portable cordless telephone 105 may be easily attached and held on the telephone adaptor 103.

Recently, with the improvement and development of portable cordless telephone, it has been suggested that a display panel be provided on the surface of a handset of a portable cordless telephone, so that when the telephone is connected in its predetermined position, a telephone number to be used to make a phone call may be displayed on the display panel. Further, the display panel may also be constructed to become a touch-panel to in advance selectively input telephone number (to make a phone call) on the display panel.

When the above-described portable cordless telephone having a display panel is mounted in a motor vehicle, it is required that the display panel be positioned in a position so that both the driver and the passenger sitting beside the driver can easily see the display panel. At least, the display panel should be disposed not to hamper the driver's operation of the motor vehicle. Preferably, the display panel is positioned close to a dashboard in front of the driver's seat. For instance, an optional console for deeply mounting a stereo equipment may also be used to mount a display panel of a portable cordless telephone, in a manner such that the main body side having the display panel is positioned at the same level as other surface portions of the optional console, so that the display panel of the portable cordless telephone will be in the same plane as those of the other electronic instruments.

However, since an option console is usually constructed within a limited standard size according to DIN (Deutsche Industrie-Normen), and since an adaptor for a portable cordless telephone is also formed within such a limited standard size, there are some inconveniences in the use of such a portable cordless telephone, as is understood in FIG. 9. Referring to FIG. 9, in use of a portable cordless telephone 105 located in the option console constructed in accordance with DIN, the connector 106 of the telephone 105 shall be detached from the connector 104 of a telephone adaptor 107, so that the telephone 105 may be moved to the handside of a user. However, it is difficult for the user's hand to catch the telephone 105 buried in a depress portion of an option console 108. Moreover, even after the telephone 105 has been caught by a user's hand, it is necessary to draw the telephone 105 out of the adaptor 107 with a considerable force in a direction shown by an arrow H. This, however, will cause a trouble that other elements or instruments 109 and 110 within the vehicle room will be accidentally damaged.

SUMMARY OF THE INVENTION

It is an object of the present invention to provide an improved mechanism for easily attaching and detaching a portable cordless telephone in a motor vehicle, even if there is only a narrow space for such mechanism and the telephone, so as to solve the above-mentioned problems peculiar to the above-mentioned prior art.

According to the present invention, there is provided a mechanism for attaching and detaching a portable cordless telephone in a motor vehicle, said mechanism comprising: a holder capable of holding the portable cordless telephone and pivotable from its inmost position in the mechanism to its maximum outwardly projected position; pressing means enabling the holder together with the portable cordless telephone to pivot towards their outwardly projected positions; lock/unlock means provided for locking/unlocking the holder and the portable cordless telephone on the mechanism.

In the mechanism according to the present invention, when the holder and the portable cordless telephone are released from their locked conditions by an action of the lock/unlock means, the holder will be pressed by the above pressing means, so that the holder together with the portable cordless telephone may pivot outwardly until the holder arrives at its maximum outwardly projected position.

In one aspect of the present invention, the holder is provided with a pivoting lever device having a stopper, said stopper being provided to stop a further pivoting movement of the holder upon the arrival of the holder at its maximum outwardly projected position.

In another aspect of the present invention, the pivoting lever device includes a pivoting gear, a friction gear engaged with the pivoting gear for producing a friction force. When the holder pivots together with the pivoting gear, the friction gear produces a dynamic friction force to the pivoting gear. When the holder stops at an outwardly projected position, the friction gear produces a static friction force to the pivoting gear.

In a further aspect of the present invention, the pressing means includes a compressible spring and a cap member for housing the compressible spring. When the holder and the portable cordless telephone are in their locked conditions, the holder will be pressed by a restoring force of the compressible spring. When the holder and the portable cordless telephone are released from their locked conditions, the holder will be caused to pivot outwardly by virtue of the restoring force of the compressible spring.

The above objects and features of the present invention will become more understood from the following description with reference to the accompanying drawings.

DETAILED DESCRIPTION OF THE PREFERRED EMBODIMENT

The present invention will be described in more detail with reference to a preferred embodiment given below.

Figure 1:
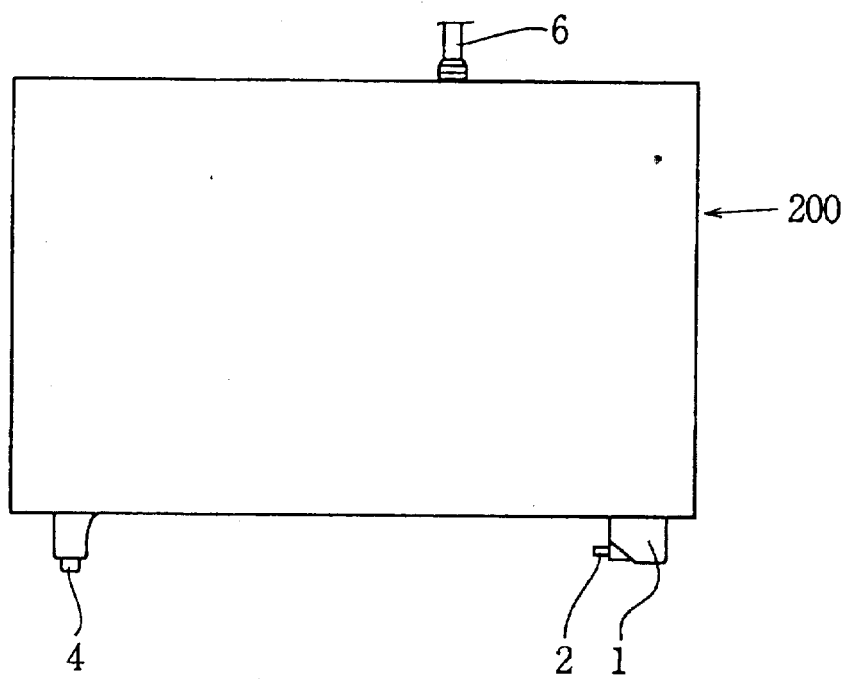
FIG. 1a is a top plane view illustrating a telephone adaptor not carrying a portable cordless telephone.
FIG. 1b is a side elevation illustrating a telephone adaptor not carrying a portable cordless telephone.
Figure 1:
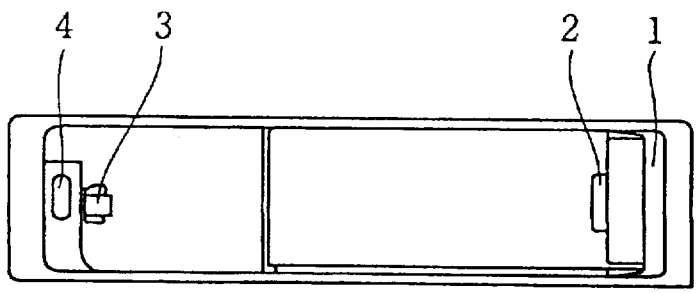

At first, reference shall be made to FIG. 1a which is a top plane view of a telephone adaptor 200 carrying a mechanism of the present invention for attaching and detaching a portable cordless telephone in a motor vehicle. Reference shall also be made to FIG. 1b which is an elevational view of the telephone adaptor 200 shown in FIG. 1a. As shown in FIGS. 1a and 1b, a mechanism of the present invention has a holder 1 which is so provided that it is pivotable in a horizontal plane. The holder 1 has a connector 2 which serves to attach or detach a portable cordless telephone (not shown) by its engagement with a connector (not shown) provided on the bottom of the telephone. Reference numeral 3 represents a hook which is provided on the other side on the adaptor 200 far away from the connector 2. Such a hook 3 is used to fix a portable cordless telephone (not shown) in a predetermined position on the telephone adaptor 200 after the connector on the telephone bottom has become engaged with the connector 2. On the other hand, the hook 3 may be released from the telephone by pushing a release button 4.

Figure 2:
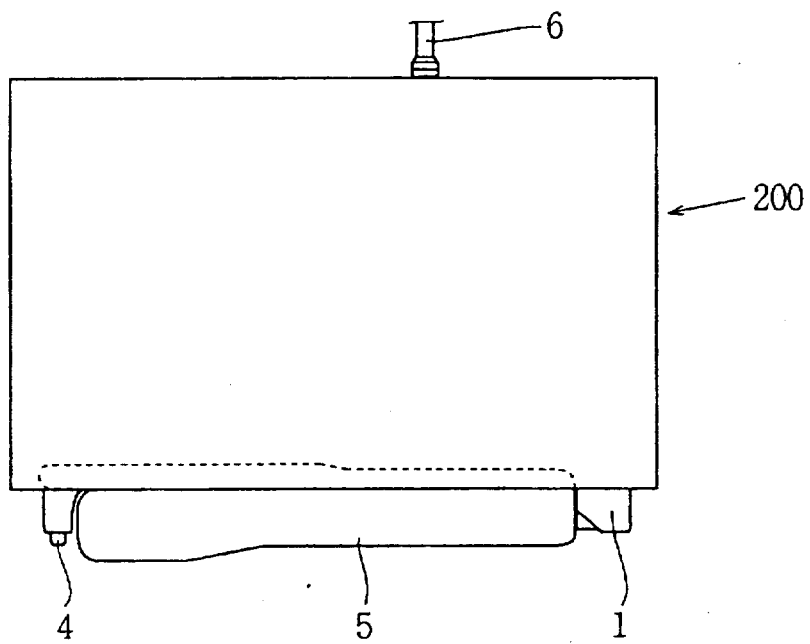
FIG. 2a is a top plane view illustrating a telephone adaptor carrying a portable cordless telephone.
FIG. 2b is a side elevation illustrating a telephone adaptor carrying a portable cordless telephone.
Figure 2:
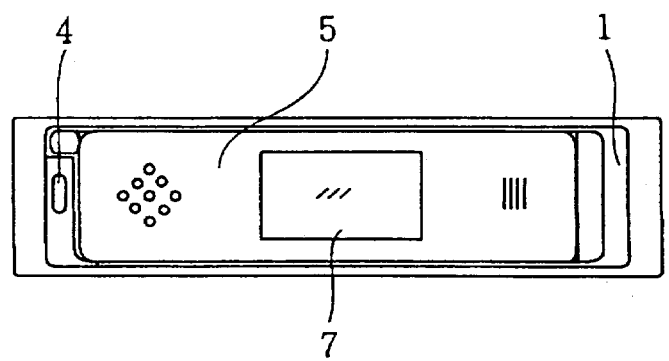

FIGS. 2a and 2b together illustrate a condition where a portable cordless telephone 5 has been received in a predetermined position on the telephone adaptor 200. At this time, the telephone 5 may be connected to a power source and/or other instrument such as a remote controller by way of a cord 6. Further, a liquid crystal display panel 7 is provided on the surface of the portable cordless telephone 5. With the use of the liquid crystal display panel 7, it is possible to display a signal when a phone call is being made to the telephone 5, or even display a telephone number which is to be used to make a phone call to a person far away from the motor vehicle.

Moreover, if the display panel 7 is constructed into a touch-panel, it is possible to perform radio or television channel selection on the display panel 7 by selectively pushing buttons thereon with the use of a remote controller (not shown).

In addition, with the use of the remote controller (not shown), a speaker of the portable cordless telephone 5 can be used as a car speaker in a vehicle room. Therefore, both the driver and passenger(s) can hear a message from a person making a phone call to this telephone without having to take the telephone 5 from the adaptor 200.

Figure 3:
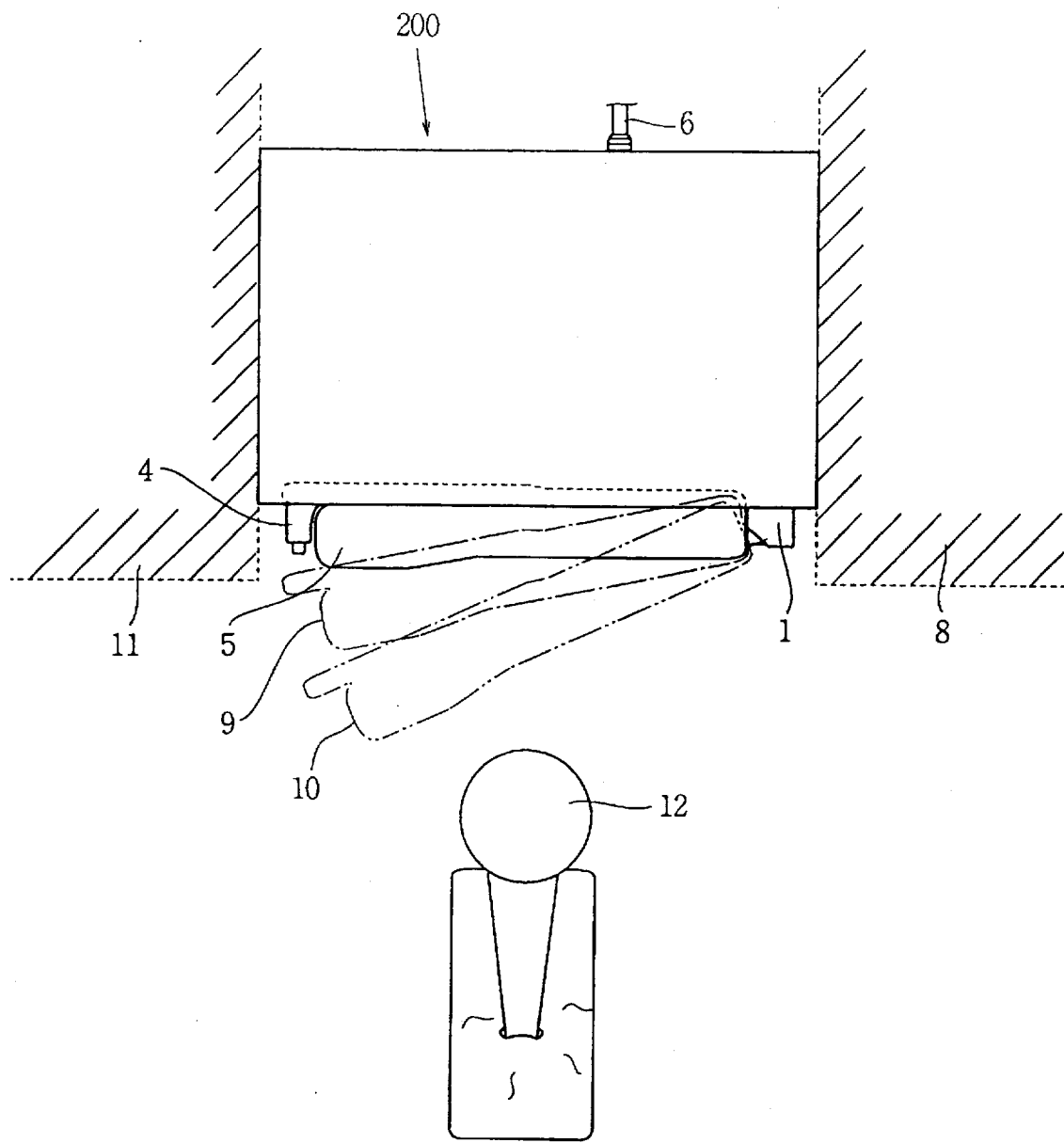
FIG. 3 is a top plane view illustrating a telephone adaptor carrying a portable cordless telephone, with the telephone being gradually projected until it arrives at its maximum outwardly projected position.

Referring to FIG. 3, upon pushing the release button 4, the holder 1 in engagement with the portable cordless telephone 5 may be caused to pivot so as to project from the telephone adaptor 200 together with the telephone 5. After the holder 1 and the telephone 5 have been in a slightly projected position 9 as shown in FIG. 3, through a certain hand operation it can continue to pivot together with the telephone 5 in the same direction until they reach a maximum outwardly projected position 10. In this way, since the subsequent pivoting movement of the holder 1 is performed through a hand operation, it is sure that a floor shift lever 12 of the motor vehicle will avoid collision with the telephone 5. Finally, the portable cordless telephone 5 may be detached from the telephone adaptor 200 by separating at the adaptor 2, so that a car driver can exactly prevent the portable cordless telephone 5 from bumping into surrounding equipments such as a dashboard 8 and a box portion 11.

The operation of the mechanism of the present invention for attaching and detaching a portable cordless telephone in a motor vehicle, will be described in detail below with reference to FIGS. 4–7.

Figure 4:
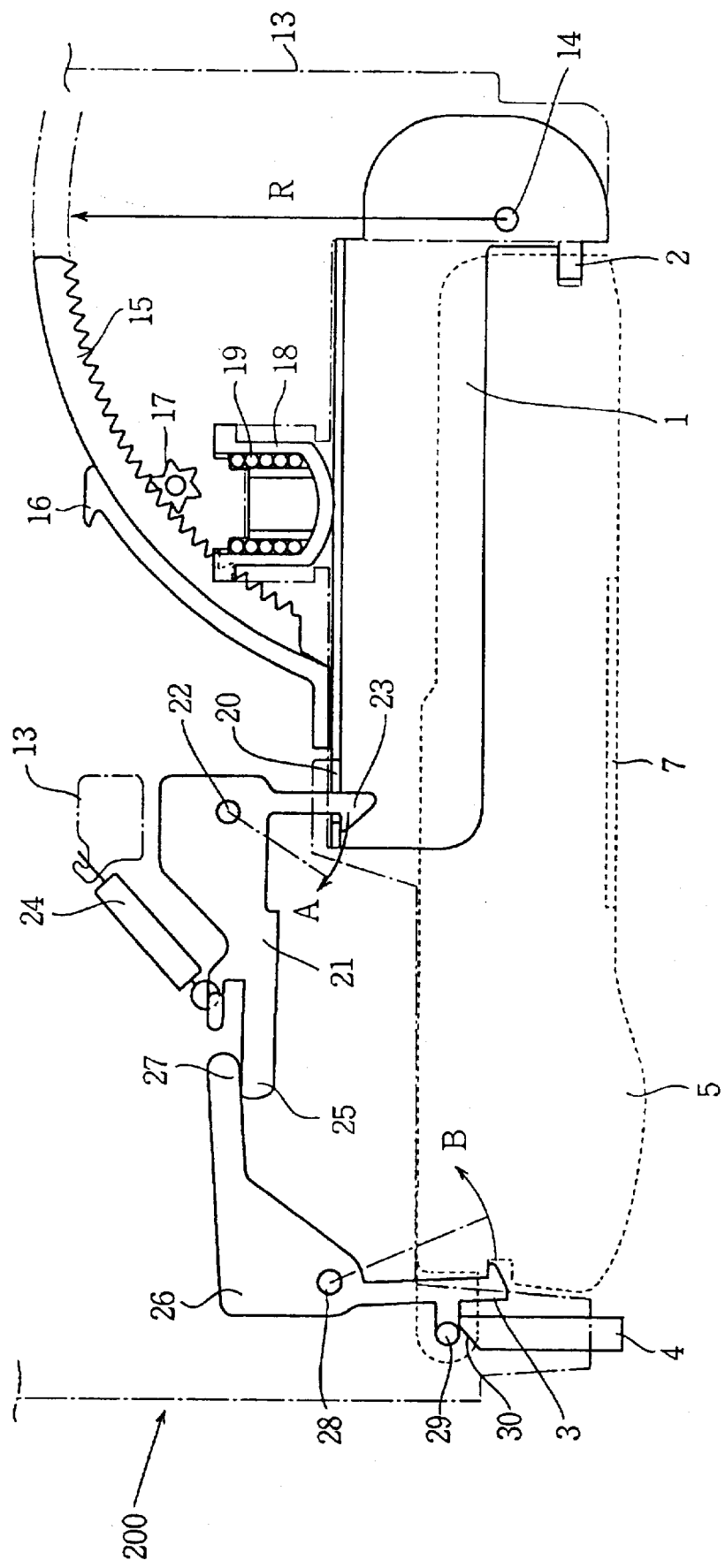
FIG. 4 is an explanatory view illustrating a mechanism of the present invention for attaching and detaching a portable cordless telephone in a motor vehicle, with the telephone positioned at its received and locked position.

FIG. 4 shows a condition where a portable cordless telephone 5 is mounted on the telephone adaptor 200. In detail, the portable cordless telephone 5 is connected with the connector 2 so as to be received in a predetermined position on the adaptor 200. The holder 1 is in the form of a plate produced by punching and bending a metal plate. As shown in FIG. 4, the holder 1 is pivotably supported on a pivoting shaft 14 which is provided on a stationary chassis 13. Further, on the back surface of the holder 1 there is provided a pivotable arc-shaped pivoting gear 15 made of a synthetic resin. The pivoting gear 15 has a predetermined length in its arc path which is formed as having a predetermined semi-diameter R with the pivoting shaft 14 being the pivoting center thereof. Such a pivoting gear 15 is engaged with a friction gear 17 which is rotatably provided on the stationary chassis 13. The friction gear 17 produces a predetermined friction resistance including a static friction force and a dynamic friction force, such that when the holder 1 is in its standstill position, the holder 1 may be exactly held in position by virtue of the static friction force. On the other hand, when the holder 1 is pivoting about the shaft 14, the pivoting movement of the pivoting gear 15 will be desirably controlled by virtue of the dynamic friction force.

Integrally formed on the back surface of the holder 1 is a stopper 16 provided to stop a further pivoting movement of the holder 1 upon the arrival of the holder 1 at its maximum outwardly projected position. In use, the stopper 16 is provided in a position corresponding to the arc portion of the pivoting gear 15.

In this way, the pivoting gear 15, the friction gear 17 and the stopper 16 together form a pivoting lever device for the mechanism of the present invention.

In addition, provided on the back surface of the holder 1 is a cap member 18 made of a synthetic resin enclosing a compressible spring 19. Here, the cap member 18 and the compressible spring 19 together form a pressing means enabling the holder 1 together with the portable cordless telephone 5 to pivot towards their outwardly projected positions, which will be described in more detail later.

As shown in FIG. 4, when the holder 1 is in its inmost position on the telephone adaptor 200, the compressible spring 19 will be compressed so as to be kept standstill in the cap member 18 by virtue of the stationary chassis 13 and the holder 1.

Moreover, as illustrated in FIG. 4, the holder 1 is formed with a notch hole 20 at one end thereof. Close to the hole of the holder 1 there is provided an arm member 21 having a hook 23. The hook 23 is so formed on the arm member 21 that it can easily engage into the notch hole 20. Such an arm member 21 is pivotably supported on a pivotal shaft 22 provided on the stationary chassis 13. Since one end of the arm member 21 is flexibly dragged by a spring 24 at one end thereof (the other end of the spring is fixed on the stationary chassis 13), the hook 23 is caused to constantly draw the holder 1 in the direction shown by an arrow A.

Referring again to FIG. 4, one portion of the arm member 21 is a lever 25 which is formed so as to engage with a lever 27 of another arm member 26. The arm member 26 is formed in the same manner using the same material as the arm member 21. Similarly, the arm member 26 is pivotably supported on a pivoting shaft 28 provided on the stationary chassis 13. Further, the arm member 26 is also formed with a hook 3, so that when the lever 25 of the arm member 21 is caused to push the lever 27 of the arm member 26 by virtue of a dragging force of the spring 24, the hook 3 of the arm member 26 will exert a pressing force against the portable cordless telephone 5 in a direction shown by an arrow B. In this way, the hook 3 of the arm member 26 will engage into the a groove formed on the side wall of the telephone 5, therefore the portable cordless telephone 5 may be exactly held in its predetermined position on the telephone adaptor 200.

As illustrated in FIG. 4, the arm member 26 is provided with a pin 29 disposed in a vertical position in a vehicle room, such that the side wall of the pin 29 may engage with an inclined surface 30 of the release button 4.

When the portable cordless telephone 5 is positioned at its attachment position on the telephone adaptor 200 as illustrated in FIG. 4, the telephone 5 is exactly stopped by the hook 3, so that any possible undesired movement of the telephone 5 during the running of a motor vehicle may be prevented.

In fact, the hook 3 and the release button 4 together form a lock/unlock means for locking/unlocking the portable cordless telephone 5 and the holder 1 on the mechanism of the present invention.

Figure 7:
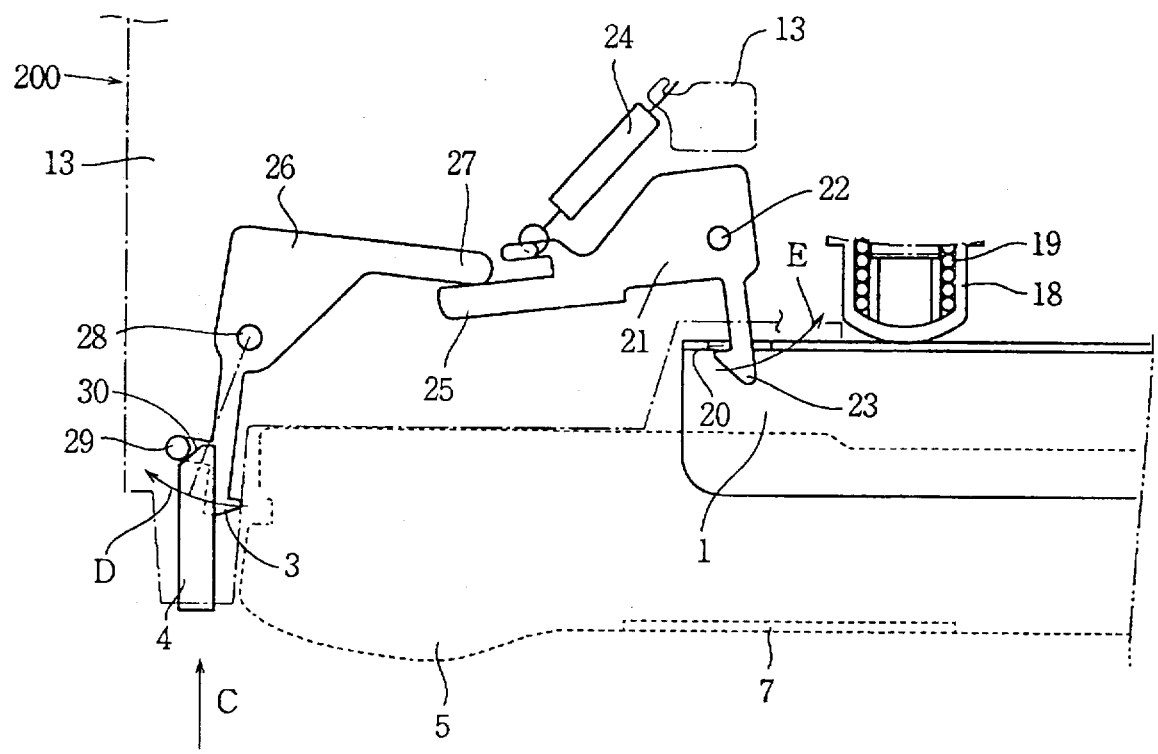
FIG. 7 is an explanatory view illustrating a mechanism of FIG. 4, with the portable cordless telephone returned back to its received and locked position.
Figure 8:
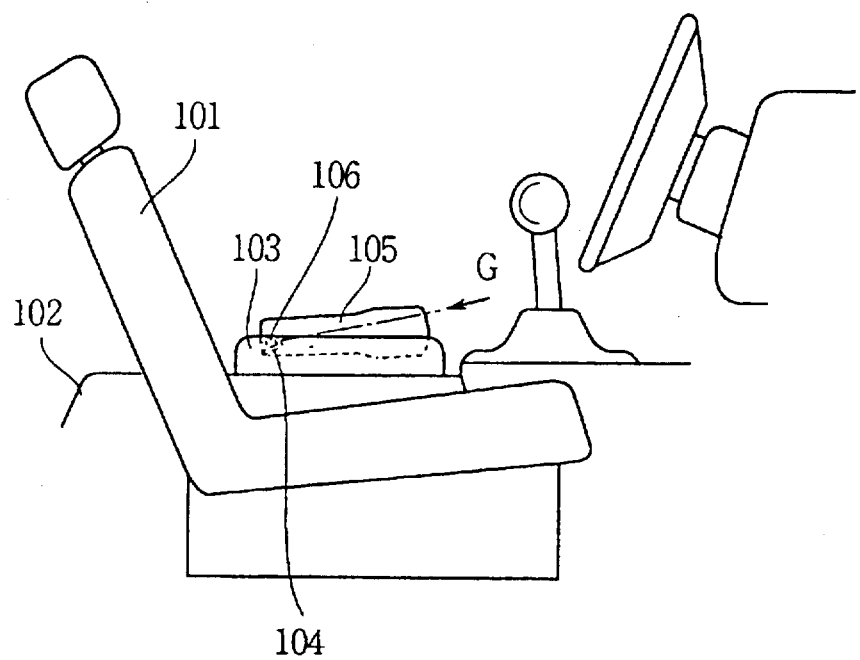
FIG. 8 is an explanatory view illustrating a conventional mechanism for attaching and detaching a portable cordless telephone in a motor vehicle.
Figure 9:
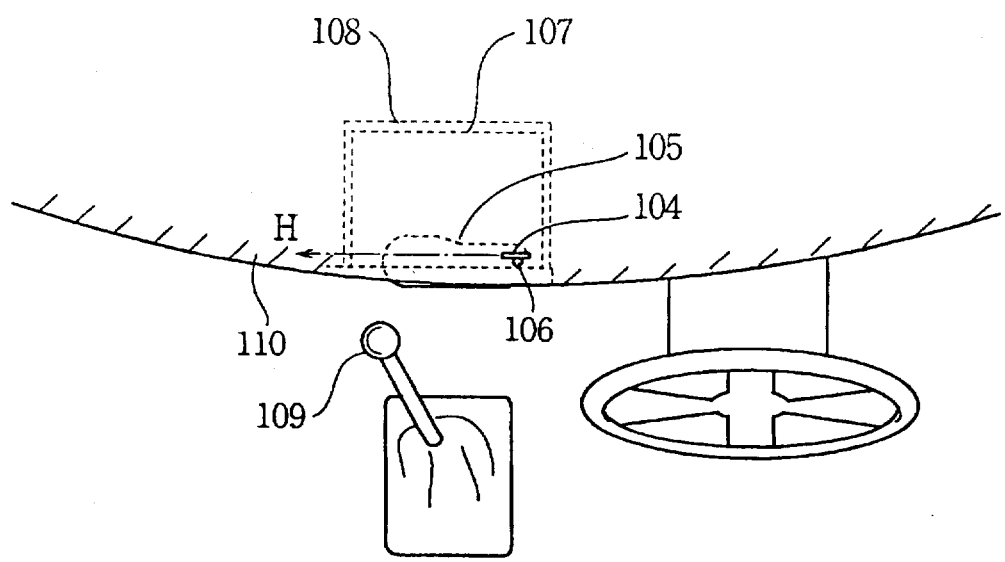
FIG. 9 is an explanatory view illustrating another conventional mechanism for attaching and detaching a portable cordless telephone in a motor vehicle.

When the portable cordless telephone 5 is to be taken from the telephone adaptor 200, the release button 4 is pushed in a direction shown by an arrow C (FIG. 7). Thus, the side wall of the pin 29 is caused to slide over the inclined surface of the release button 4, this cause the arm 26 to pivot in a direction shown by an arrow D. In this way, the hook 3 of the arm member 26 will be released from the telephone 5. At this moment, since the lever 27 is caused to pivot to press the lever 25 in a direction opposite to the direction C, the arm 21 is forced to pivot in a direction shown by an arrow E (FIG. 7), against an spring force of the spring 24. As a result, the hook 23 is released from the notch hole 20 of the holder 1.

Figure 5:
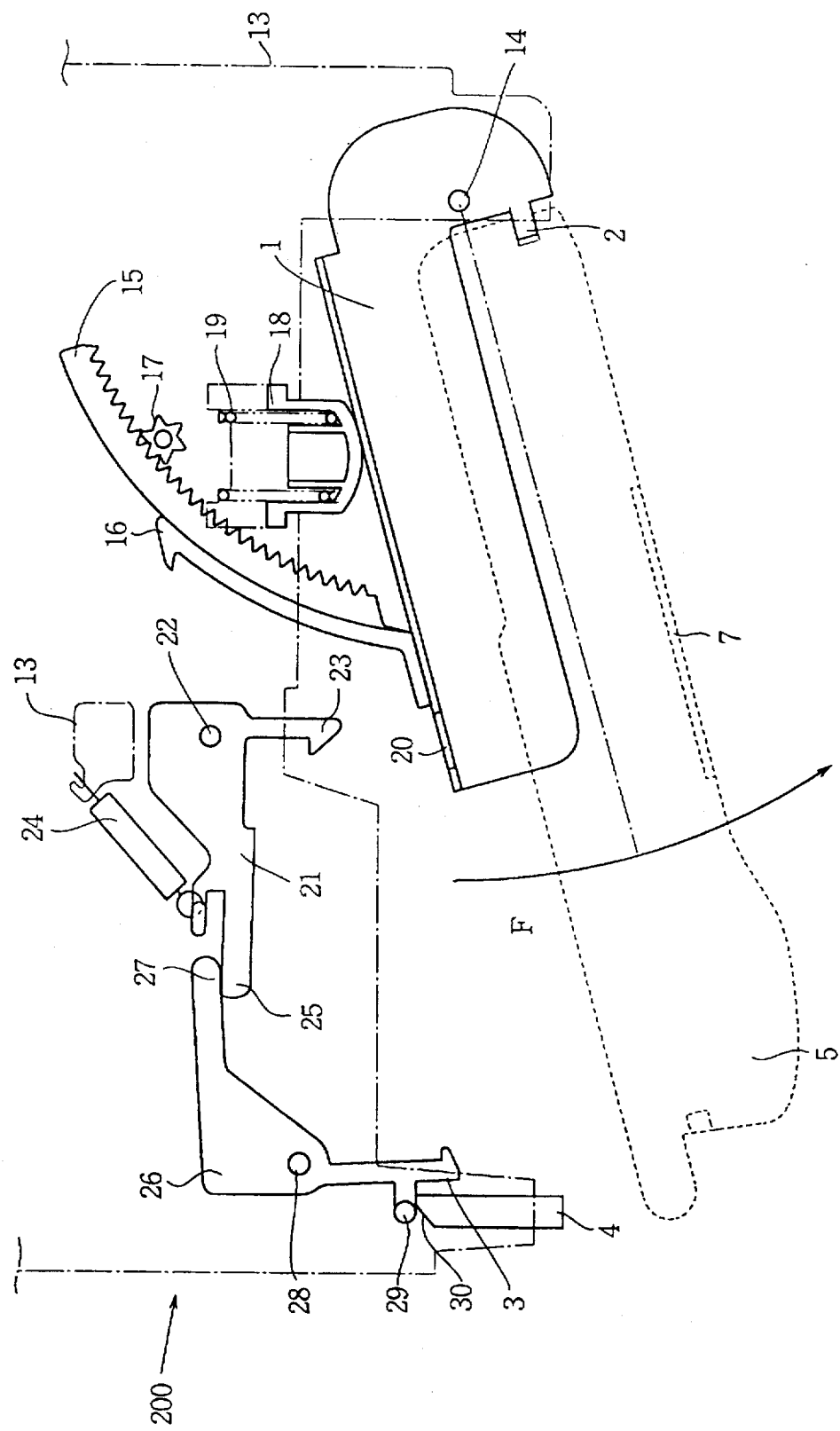
FIG. 5 is an explanatory view illustrating a mechanism of FIG. 4, with the portable cordless telephone positioned at one of its outwardly projected positions.

As soon as the hook 23 is released from the holder 1, the compressed state of the spring 19 is also released, so that the spring 19 will press the holder 1 through the cap member 18 by virtue of its restoring force. Thus, being effected by the restoring force of the spring 19, the holder 1 together with the telephone 5 are pressed in a direction F shown by an arrow F (FIG. 5), until they arrive at one projected position as shown in FIG. 5. At this moment, the pivoting gear 15 secured on the holder 1 will cause the friction gear 17 to rotate. Thus, effected by the dynamic friction force of the friction gear 17, the restoring force of the spring 19 is controlled, so that the holder 1 is enabled to pivot smoothly to a predetermined projected position in a controlled constant speed. After arriving at the predetermined projected position, the holder 1 will be kept standstill with the effect of the static friction force of the small gear 17.

In this way, the telephone 5 may be easily taken from the telephone adaptor 200 simply by pushing the release button 4 and separating the telephone 5 from the connector 2, avoiding any possibility of damaging the surrounding equipments in a vehicle room.

On the other hand, when the portable cordless telephone 5 is returned back to the telephone adaptor 200, the holder 1 together with the telephone 5 will be changed from a condition shown in FIG. 5 back to a condition shown in FIG. 4. This time, as shown in FIG. 7, since the arm member 21 is dragged by the spring 24 to pivot in a direction opposite to the direction E (FIG. 7), the lever 25 of the arm member 21 will press against the lever 27 of the arm member 26, so that the arm member 26 will pivot in the same direction as direction E. As a result, the pin 29 integrally formed with the arm member 26 will press against the inclined surface of the release button 4. Thus, the arm members 21, 26 and the release button 4 will all be changed back to the positions shown in FIG. 4.

The following description will be given to further explain some other details of the operation for detaching the telephone 5 from the telephone adaptor 200.

Figure 6:
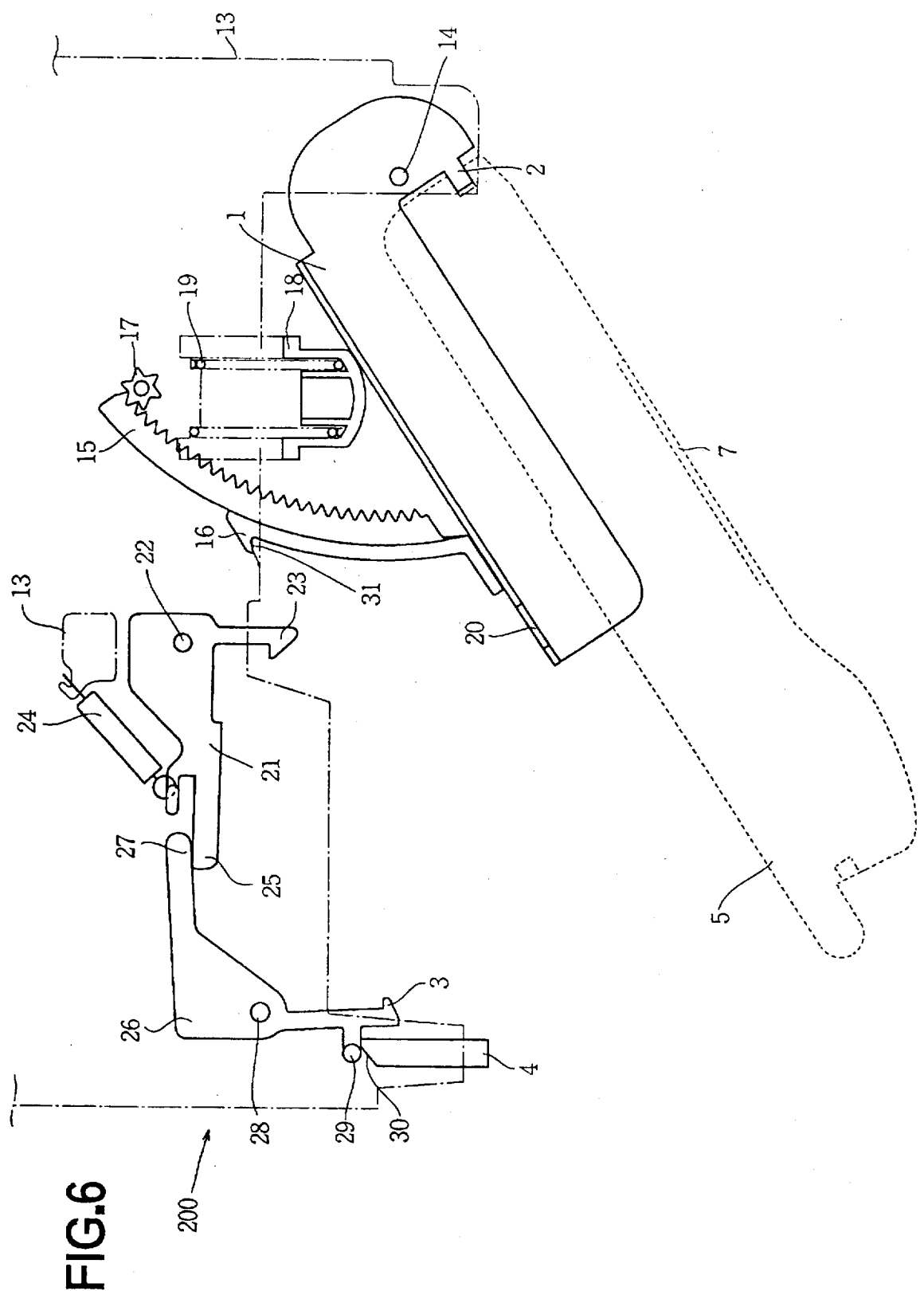
FIG. 6 is an explanatory view illustrating a mechanism of FIG. 4, with the portable cordless telephone positioned at its maximum outwardly projected position.

FIG. 5 illustrates a condition where the holder 1 together with the telephone 5 have been pivoted to project from the telephone adaptor 200. After the holder 1 together with the telephone 5 are caused to pivot still further in a direction shown by an arrow F (FIG. 5), both of them will arrive at their maximum outwardly projected positions. FIG. 6 illustrates a condition where the holder 1 together with the telephone 5 have arrived at their maximum outwardly projected positions. Here, the stopper 16 will engage with a portion 31 on the chassis 13, so as to stop a further pivoting movement of the holder 1 upon the arrival of the holder 1 at its maximum outwardly projected position. During a process from a condition of FIG. 5 to a condition of FIG. 6, the pivoting gear 15 secured on the holder 1 will cause the friction gear 17 to rotate. Thus, with the use of the dynamic friction force of the friction gear 17, the restoring force of the spring 19 is controlled, so that the holder 1 is enabled to pivot smoothly to a predetermined maximum projected position in a controlled constant speed. In this way, the holder 1 and the telephone 5 may be stopped and kept still at any desired position between the position shown in FIG. 5 and the position shown in FIG. 6, with the effect of the static friction force of the friction gear 17.

When the portable cordless telephone 5 is to be returned back to the telephone adaptor 200, the telephone 5 shall at first be connected to the connector 2 of the holder 1 which has been kept still at one of its projected positions, with the effect of the static friction force of the small gear 17. The holder 1 together with the telephone 5 will be changed from a condition shown in FIG. 6 back to a condition shown in FIG. 4, so that the telephone 4 may be received into the predetermined attachment position in the telephone adaptor 200. At this moment, as shown in FIG. 7, the hook 23 of the arm member 21 will be pressed by the holder 1, so that the arm member 21 is forced to pivot in a direction E. With the pivoting movement of the arm member 21 in the direction E, the arm member 26 and the hook 3 will pivot in a direction D, so that the portable car telephone 5 will be received into its attachment position on the telephone adaptor 200. Then, the hook 3 of the arm member 26 will move in a direction opposite to the direction D so as to enter a notch of the telephone 5 in order that the telephone 5 may be exactly held in its attachment position on the telephone adaptor 200. Meanwhile, the release button 4 will be changed in its state back to the position of FIG. 4.

As is understood from the above description, with the use of the present invention, when a portable cordless telephone is to be taken from a telephone adaptor, since the holder carrying a telephone may be caused to project from the telephone adaptor until it arrives at its maximum outwardly projected position, the telephone may be smoothly separated from the holder, thus avoiding any possible collision of the telephone with the surrounding electronic instruments and other interior parts within a vehicle room.

Moreover, when the portable car telephone is to be attached back to the telephone adaptor, the telephone may be at first be connected to the holder. Then, the holder together with the telephone may be received into the telephone adaptor. With the use of lock/unlock means, the telephone will be exactly fixed in a predetermined attachment position on the telephone adaptor.

Thus, with the use of the present invention, a cordless telephone may be easily attached to and detached from a telephone detector with only very simple operation, thereby avoiding any possible damages to the surrounding elements in a vehicle room, which otherwise will be caused by a possible collision of the portable cordless telephone with the surrounding elements.

While the presently preferred embodiment of the this invention have been shown and described above, it is to be understood that these disclosures are for the purpose of illustration and that various changes and modifications may be made without departing from the scope of the invention as set forth in the appended claims.

What is claimed is:

1. A mechanism for attaching and detaching a portable cordless telephone in a motor vehicle, said mechanism comprising:

a holder capable of holding the portable cordless telephone and pivotable from its inmost position in the mechanism to its maximum outwardly projected position;

pressing means enabling the holder together with the portable cordless telephone to pivot towards their outwardly projected positions;

lock/unlock means provided for locking/unlocking the holder and the portable cordless telephone on the mechanism;

wherein when the holder and the portable cordless telephone are released from their locked conditions by an action of the lock/unlock means, the holder will be pressed by the above pressing means, so that the holder together with the portable cordless telephone may pivot outwardly until the holder arrives at its maximum outwardly projected position.

2. A mechanism according to claim 1, wherein the holder is provided with a pivoting lever device having a stopper, said stopper being provided to stop a further pivoting movement of the holder upon the arrival of the holder at its maximum outwardly projected position.

3. A mechanism according to claim 2, wherein the pivoting lever device includes a pivoting gear, a friction gear engaged with the pivoting gear for producing a friction force.

4. A mechanism according to claim 3, wherein when the holder pivots together with the pivoting gear, the friction gear produces a dynamic friction force to the pivoting gear.

5. A mechanism according to claim 3, wherein when the holder stops at an outwardly projected position, the friction gear produces a static friction force to the pivoting gear.

6. A mechanism according to claim 1, wherein the pressing means includes a compressible spring and a cap member for housing the compressible spring.

7. A mechanism according to claim 1 or 6, wherein when the holder and the portable cordless telephone are in their locked conditions, the holder will be pressed by a restoring force of the compressible spring.

8. A mechanism according to claim 1 or 6, wherein when the holder and the portable cordless telephone are released from their locked conditions, the holder will be caused to pivot outwardly by virtue of the restoring force of the compressible spring.

* * * * *